Patented June 24, 1952

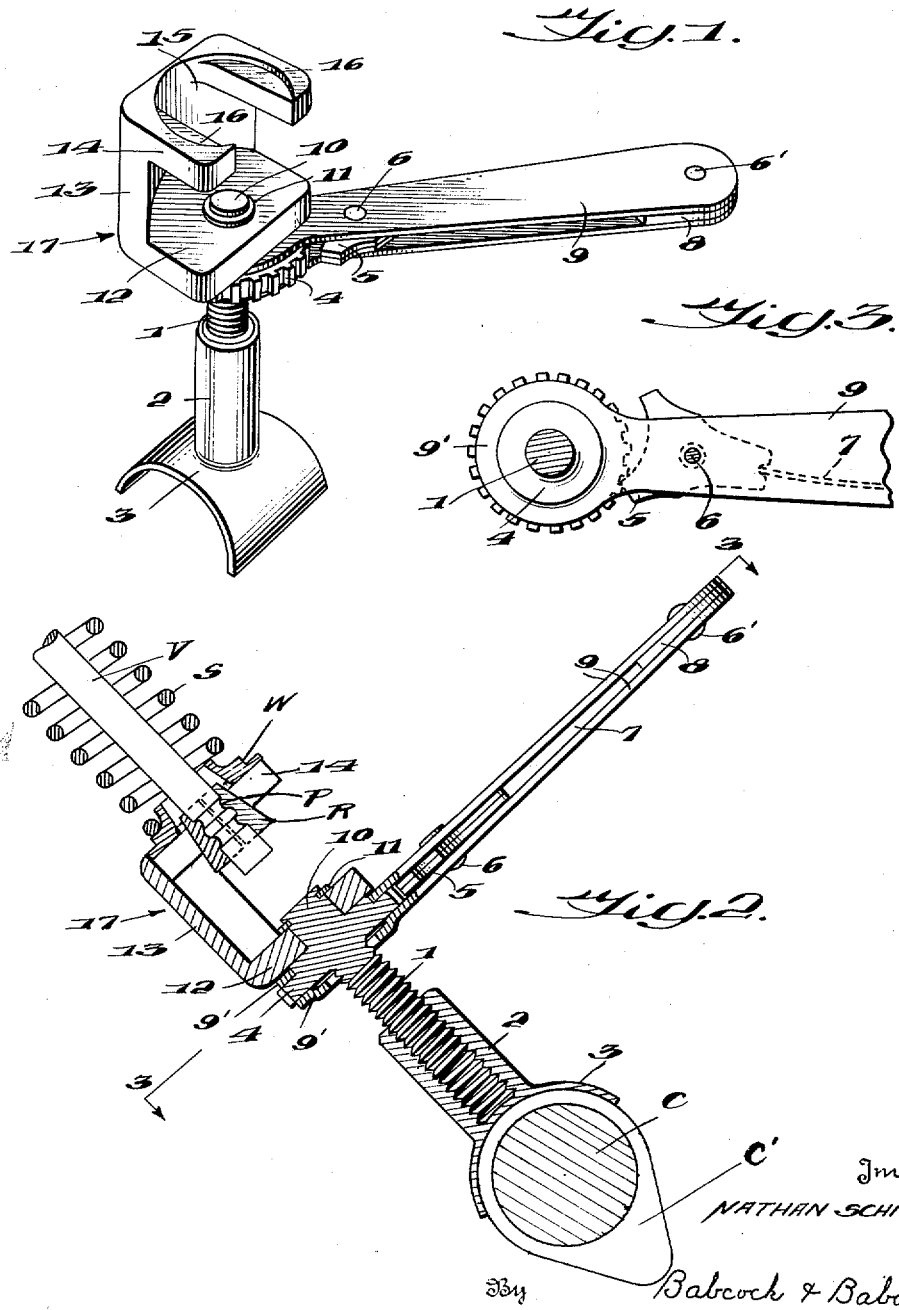

2,601,639

UNITED STATES PATENT OFFICE 2,601,639

VALVE SPRING COMPRESSOR

Nathan Schneider, Mount Vernon, N. Y., assignor to K-D Manufacturing Company, Lancaster, Pa., a corporation of Pennsylvania Application September 18, 1947, Serial No. 774,819

2 Claims. (Cl. 29—217)

1

This invention relates to valve spring compressors for internal combustion engines of the V-type such as employed in present-day Cadillac automobiles, and more particularly to such compressors of that type which employ threaded actuating means to impart a compressive thrust against the valve spring.

In internal combustion engines of the type aforementioned each of the valves is disposed with the axis of its stem and spring extending radially relative to a cam shaft which is journalled in the engine block, and the lower ends of the valve stem and spring are radially spaced from the shaft to provide room for valve lifter assemblies which transmit movement from the shaft to the valves, such assemblies being removable to permit disassembly of the valves.

The primary object of the present invention is to provide a valve spring compressor which utilizes the relative positions of the valves and cam shafts in engines of this type in order to accurately position the compressor in such manner that the threaded axis of its actuating means and the thrust exerted thereby is in substantially true axial alignment with the valve spring and stem, thereby eliminating any binding and attaining a minimum amount of friction in the operation of the compressor, avoiding damage to the valves, and greatly facilitating the operative positioning and use of the compressor.

To this end the invention broadly comprises suitable axially extensible threaded actuating means including two or more cooperating threaded elements relatively rotatable about their threaded axis, and means for causing relative rotation and consequent relative axial movement of said elements. A shaft engaging jaw is carried by one of said elements at one of the axial extremities of the actuating means, said jaw being disposed and arranged in any suitable manner to support the compressor on said cam shaft with its threaded axis in radial relation thereto. A compressor jaw is carried by another of said threaded elements at the other axial extremity of the actuating means, said jaw being provided with socket or other suitable means in axial alignment with said threaded actuating means, for concentrically receiving the adjacent end of the valve assembly and transmitting axial compressing force to the valve spring, said compressor jaw cooperating with the shaft engaging jaw aforementioned to operatively position the compressor with its threaded actuating means in substantially true axial alignment with the valve assembly.

2

Further more specific objects of the invention are: to provide such a compressor which is of simplified and extremely compact construction; to provide in such a compressor an advantageous arrangement of ratcheted operating means for causing relative rotation between the threaded elements, including a ratchet wheel associated with the actuating screw in such manner as to permit the maximum range of relative axial movement between the said screw and its cooperating threaded element, while at the same time serving as a thrust bearing for the compressor jaw; to provide in such a compressor a compressor jaw which is disposed and arranged to catch and retain the valve keys or retainers as these are released from the valve stem, preventing same from falling into the crank case; and to provide such a compressor jaw which permits ready access to the lower end of the valve assembly to permit easy insertion or removal of the valve keys or retainers.

The foregoing objects and advantages are attained by the preferred embodiment of the invention illustrated in the accompanying drawings, in which:

Figure 1 represents a perspective view of the said preferred embodiment in its entirety;

Figure 2, an axial sectional view through the device shown in Figure 1, showing same applied in operative position to a valve assembly to compress the valve spring thereof, the valve stem and spring being shown fragmentarily and the operating handle or lever of the compressor being shown in elevation; and Figure 3, a fragmentary sectional view taken on the line 3—3 of Figure 2, looking in the direction of the arrows.

Referring now in detail to the accompanying drawings, and considering first the valve assembly with which my invention is adapted for use, a diagrammatic view of such an assembly is included in Figure 2 of the accompanying drawings. It will be seen that each valve is disposed with the axis of its stem V and spring S extending in a radial direction relative to a cam shaft C, the inner end of the spring and stem being radially spaced from the shaft and the spring being maintained under compression on the stem V by a usual valve spring washer W which is maintained against axial displacement on the stem by the usual retainers or keys R.

In this arrangement the washer W is formed with a downwardly diverging conical aperture therethrough so that when said washer is urged downwardly by the spring S the frustro-conical retainers or keys R will be conformingly received in said aperture and confined radially against the stem V, with their radially inwardly projecting ribs or ridges P received in cooperating annular grooves or keyways in the valve stem, thereby normally retaining the valve spring in compressed condition.

Obviously where it is desired to disassemble the valve it is necessary to raise the washer W axially against the pressure exerted by the spring S, until said washer is sufficiently clear of the retainers or keys R, as shown in Figure 2, to permit said keys to fall or be removed from the valve stem in usual manner. And where it is desired to reassemble the valve, the spring and washer are first applied to the valve stem and raised to the position shown in Figure 2, whereupon the retainers R may be inserted in their proper positions about the valve stem and the washer lowered in place about them.

The foregoing arrangement and method of manipulation are well known in the prior art, and constitute no part of the present invention, but are thus briefly referred to merely in order to facilitate a rapid understanding of my invention.

The valve spring compressor of my invention comprises axially extensible threaded actuating means, including telescopically arranged relatively rotatable male and female threaded elements 1 and 2 respectively.

In the preferred embodiment of the invention the male element 1 is in the form of a usual threaded rod or screw which is utilized as the rotatable element, while the female element 2 is in the form of an internally threaded sleeve or bushing which is in threaded operative engagement with said screw 1 and is utilized as a stationary element.

Since it is desirable to attain as great a degree of relative axial movement as possible between the elements 1 and 2, while maintaining their individual lengths and hence the contracted dimensions of the compressor in its entirety at a minimum, I prefer to form the cooperating threaded portions of said respective members of substantially equal axial length, as shown.

Means for causing relative rotation between the threaded elements 1 and 2 in the preferred embodiment comprises a ratchet wheel 4 fixedly coaxially attached to and preferably integral with the screw 1 above and immediately adjacent its operative threaded portion, in conjunction with a suitable operating lever 9 oscillatably associated therewith, said lever being operatively connected to the ratchet wheel through the medium of a suitable spring loaded pawl 5 preferably of the double or reversible type shown in Figure 3, so that the pawl may be flipped about its pivot 6 to either of its operative positions at will to cause oscillation of the lever 9 to produce intermittent rotation of the screw in a direction to either expand or contract the compressor in an axial direction.

In the instant embodiment of the invention the lever consists of two plates 9 which are fastened together by the rivets 6 and 6' and maintained in relatively spaced relation by the ratchet wheel 4 journalled between the forward ends thereof and the spaced plate 8 disposed between the rear end portions thereof. The spring 7 which may be of the leaf type is compressed in an endwise direction between the spacer plate 8 and the rear end of the pawl 5, the arrangement being such that the pawl may be flipped into either of its operative positions, causing the pawl engaging end of the spring 7 to move past its dead center position with relation to the pivot 6 and thereby resiliently maintain said pawl in either of its two operative positions as desired. This particular arrangement of the lever 9 in association with the ratchet wheel 4 constitutes no part of the present invention, being merely illustrative and generally equivalent to the corresponding arrangement disclosed in Patent No. 1,380,328 to Wroughton.

Carried by one of said threaded elements, preferably the bushing 2, at one axial extremity of the actuating means, is a stationary shaft engaging jaw 3 which is preferably securely rigidly fixed to the bushing 2, as by forming same integral therewith or brazing or welding it thereto. The jaw 3, which functions as a stationary supporting base for the compressor, is shaped in a suitable manner to support the compressor with the threaded axis of the elements 1 and 2 in radial relation to the shaft C.

A suitable construction for the base or jaw 3 is shown in the accompanying drawings, wherein same is of arcuate shape with its axis of curvature transverse to and in the plane of the said threaded axis, and its radius of curvature is equal to that of the concentric portion of the cam C' which it is adapted to operatively engage. Since this portion of the cam C' is concentric to the cam shaft C, it will thus be apparent that the jaw 3 will support the compressor in the desired radial position relative to the shaft C, as shown in Figure 2 of the drawings. Where it is desired to adapt the base or jaw 3 for engagement with cams having concentric portions of varying diameters, same may be formed of a suitable V-cross-section, with the line of intersection between the sides of the V disposed in a common plane with the axis of elements 1 and 2 and normally thereto.

Carried by the threaded element 1 at the other or upper axial extremity of the actuating means is a movable compressor jaw designated 17 in its entirety, which is disposed and arranged to coaxially receive the lower end of the valve assembly and exert axial compressing force on the valve spring washer W thereof, said compressor jaw cooperating with the stationary jaw or base 3 aforementioned to operatively position the compressor with its threaded actuating means 1 and 2 in substantially true axial alignment with the valve spring S of the valve assembly.

Basically such a compressor jaw 17 comprises a compressor plate 14 and any suitable means such as the integral plates 12 and 13 for supporting same in relatively axially spaced axially fixed rotatable relation to the adjacent extremity of its respective threaded element 1. Said plate 14 is formed with a central opening 15 therethrough in axial alignment with the actuating means 1 and 2 to receive the conical flange of the washer W and permit passage of the valve stem V through said plate during operation of the compressor. Formed in the plate 14 on opposite sides of the slot or central opening 15 are segments of an upwardly opening circular socket 16 which is concentric to the axis of the actuating means 1 and 2, the diameter of this socket being such as to permit same to snugly receive the spring supporting portion or cup of the washer W, and the bottom thereof being disposed to abut axially against the bottom of said cup to transmit upward compressive thrust thereto.

A suitable rotatable or swivelled connection between the jaw 17 and screw 1 may be provided by forming the screw 1 with an axial upward extension in the form of a stub shaft or pivot 10 projecting above the ratchet wheel 4. The mounting plate 12 of the jaw is formed with a central bearing hole to receive this shaft 10, and is rotatably journalled thereon with the lower surface of the plate 12 rotatably abutting against the upper surface of the ratchet wheel 4, which thus functions as a thrust bearing for the jaw 17.

The stub shaft 10 in such assembled relation projects slightly above the upper surface of the connecting plate 12 and its projecting end is preferably formed with an annular groove in which is removably disposed a horseshoe retainer 11, as shown in Figures 1 and 3, to prevent upward displacement of the jaw 17. With this simple and economical arrangement, it will be seen that the shaft or pivot 10 projects only very slightly into the cavity of the jaw 17 and thus is positioned to avoid obstructing the operation of said jaw.

The connector plate 13 of the compressor jaw is eccentrically located relative to the compressor axis in order to avoid interference with the movement of the valve stem V into the jaw 17 in operation. In order to provide efficient means for catching the retainers R as same are released or dropped during operation of the compressor, said plate 13 is preferably formed to present a concave or channeled configuration or surface toward said axis. Thus where the compressor is used in connection with the diagonally disposed valves of V-type engines, the plate 13 will normally be disposed beneath the valve retainers to catch and retain same in its concave or hollow, said plate 13 cooperating in this respect with the mounting plate 12 since the retainers will normally slide down the inclined plate 13 to rest against the plate 12.

In the operation of the invention, where it is desired to remove the retainers R of any given valve, the compressor, with its jaws in contracted position, is placed beneath said valve with its lower stationary jaw 3 in operative engagement with the operating cam C' for said valve, the cam shaft C first having been rotated to place said cam C' with its lobe or nonconcentric portion directed away from the valve stem V, whereby the jaw 3 engages that portion of the cam C' which is concentric to the shaft C and thus supports the compressor with its axis in radial relation to said shaft. The compressor jaw 17 is dipsosed beneath the said valve with its socket 16 in substantial axial alignment with the valve spring S and washer W, and its connecting plate 13 disposed beneath said retainers R. After setting the pawl 5 in obvious manner, the lever 9 is oscillated to raise the compressor jaw 17 into operative engagement with the valve spring washer W, the stationary jaw 3 being adjusted slightly axially along the cam C' as required to insure that the washer W seats properly in the socket 16. After the compressor jaw 17 is thus in operative engagement with the washer W the compressor will automatically be positioned with the axis of its threaded elements 1 and 2 in coaxial relation to the valve spring S, expansion of the compressor jaws will then be continued until the washer W is raised sufficiently clear of the retainers R to permit the latter to fall clear of the valve stem V, the concave connecting plate 13 in conjunction with the mounting plate 12 serving to catch same and prevent their falling into the crank case.

In order to replace the retainers R, the spring S is compressed in the manner aforementioned, and the retainers are inserted and held in position by any usual tool which may be inserted between the plates 12 and 14 to place and maintain them in position about the valve stem V while, with the pawl 5 in reversed position to permit lowering of the jaw 17, the lever 9 is operated to lower the washer W into position about said retainers.

It will be seen that I have provided a compressor which is extremely simple in construction and operation, and which is so compact that it may be readily carried in the mechanic's pocket. It will further be seen that said device is "self aligning" in operation, permits easy access to the valve spring retainers, and also provides means for catching said retainers should they drop.

Having thus described my invention, I claim:

1. A valve spring compressor, comprising axially extensible threaded actuating means, said means including cooperating telescopically arranged male and female threaded elements and means associated with said male element for causing relative rotation therebetween about their threaded axis, a stationary shaft engaging jaw fixedly carried by said female element at one axial extremity of said actuating means, said jaw being of arcuate shape having its axis of curvature in a common plane with and perpendicular to said threaded axis and a compressor jaw carried by said male element for axial extension movement therewith at the other axial extremity of said actuating means, said compressor jaw being rotatable relative to said male member, and comprising a compressor plate spaced axially from said actuating means and formed with an opening therethrough in axial alignment with said actuating means, said plate being formed with segments of an upwardly opening circular socket on opposite sides of said opening concentric to said threaded axis.

2. A valve spring compressor as defined in claim 1, wherein the compressor jaw comprises a mounting plate formed with a central bearing hole rotatably receiving said male threaded element, and an eccentrically disposed axially extending connecting plate projecting upwardly from one edge of said mounting plate and presenting a concave face toward the axis of said threaded elements, said connecting plate supporting the said compressor plate.

NATHAN SCHNEIDER.

REFERENCES CITED

The following references are of record in the file of this patent:

UNITED STATES PATENTS

| Number | Name | Date |
|---|---|---|
| 282,828 | Worswick | Aug. 7, 1883 |
| 1,019,656 | Kelly | Mar. 5, 1912 |
| 1,050,746 | Morgan | Jan. 14, 1913 |
| 1,138,277 | Carll | May 4, 1915 |
| 1,316,753 | Williams | Sept. 23, 1919 |
| 1,345,651 | Wilgus | July 6, 1920 |
| 1,356,978 | Graves | Oct. 26, 1920 |
| 1,380,328 | Wroughton | May 31, 1921 |
| 1,873,294 | Cosgrove | Aug. 23, 1932 |